United States Patent
Shouji et al.

[11] Patent Number: 5,556,902
[45] Date of Patent: Sep. 17, 1996

[54] SILICONE ANTIFOAMING AGENT COMPOSITION

[75] Inventors: Hiroaki Shouji; Koichi Aizawa, both of Kanagawa, Japan

[73] Assignee: Dow Corning K.K., Tokyo, Japan

[21] Appl. No.: 611,223

[22] Filed: Nov. 6, 1990

[30] Foreign Application Priority Data

Nov. 8, 1989 [JP] Japan .................................. 1-28810

[51] Int. Cl.$^6$ ................................. C08K 5/15
[52] U.S. Cl. .................... 524/114; 524/188; 524/268; 524/864; 252/358; 252/321
[58] Field of Search .................... 524/268, 114, 524/188, 864; 252/358, 321

[56] References Cited

U.S. PATENT DOCUMENTS

| | | | |
|---|---|---|---|
| 2,744,079 | 5/1956 | Kilbourne et al. | 324/268 |
| 4,433,096 | 2/1984 | Bokerman et al. | 524/864 |
| 4,514,319 | 4/1985 | Kulkami et al. | 252/321 |
| 4,639,489 | 1/1987 | Aizawa et al. | 524/588 |
| 4,742,101 | 5/1988 | Yoshida | 524/268 |
| 4,762,640 | 8/1988 | Schiefer | 252/358 |
| 4,961,877 | 10/1990 | Shimizu et al. | 252/358 |

OTHER PUBLICATIONS

JP-A-59/069110—Shinetsu Kagaku Kogyo.

*Primary Examiner*—Melvyn I. Marquis
*Assistant Examiner*—Karen A. Dean
*Attorney, Agent, or Firm*—Robert L. McKellar

[57] ABSTRACT

The present invention provides a silicone antifoaming agent composition excellent in the persistence of the foam controlling effect. The silicone antifoaming agent composition comprises a polydiorganosiloxane and silica, which form an antifoaming agent to be improved, and 4 to 2,500 parts by weight per 100 parts by weight of the sum total of the polydiorganosiloxane plus silica of a modified silicone oil having at least one organic group bonded to a silicon atom and having at least one functional group selected from among epoxy, amino, amide, carboxyl, alkoxyl and hydroxyl groups and at least one substituted or unsubstituted polyoxyalkylene group bonded to a silicon atom.

5 Claims, 1 Drawing Sheet ns,902

SILICONE ANTIFOAMING AGENT COMPOSITION

BACKGROUND OF THE INVENTION

The present invention relates to a silicone antifoaming agent composition excellent in the persistence of the foam controlling effect.

In various industrial processes involving a treatment step of liquid or a treatment step with liquid, foaming often presents a serious problem. That is, the foaming of liquid is causative of a reduction in the efficiency of the treatment or the qualify of a product.

It is well known that an antifoaming agent having an effect of breaking foam, i.e., a foam breaking effect, or an effect of lowering the foamability of liquid, i.e., a foam controlling effect is used in order to solve the problematic foaming of liquid. Particularly, a silicone antifoaming agent is favorable, because it is chemically stable, scarcely affects an object, and exhibits a relatively high antifoaming effect even in a minute amount.

Up to this time, there have already been known various silicone antifoaming agents, for example, silicone oils, viscous compounds comprising a silicone oil and a fine inorganic powder such as carbon black, alumina or colloidal silica (i.e., oil compounds), solutions of such a silicone oil or oil compound in an organic solvent, and oil-in-water emulsions prepared by the emulsification of such an oil compound with a surfactant.

However, these silicone antifoaming agents are poor in the persistence of the foam controlling effect. Accordingly, when a prolonged control of foaming is required, they cannot always satisfy the requirement sufficiently.

BRIEF SUMMARY OF THE INVENTION

The present invention has been made under the above circumstances and has the object of providing a silicone antifoaming agent composition excellent in the persistence of the foam controlling effect. This object, and others which will become apparent to one of ordinary skill in the antifoaming agent art, are obtained by the silicone antifoaming agent composition of the present invention which comprises (1) a polydiorganosiloxane, (2) silica and (3) 4 to 2,500 parts by weight per 100 parts by weight of the sum total of the components (1) and (2) of a modified silicone oil having in its molecule at least one functional organic group bonded to the silicone atom and having at least one functional group selected from among epoxy, amino, amide, carboxyl, alkoxyl and hydroxyl groups and at least one substituted or unsubstituted polyoxyalkylene group bonded to the silicone atom.

DETAILED DESCRIPTION OF THE INVENTION

The silicone antifoaming composition of the present invention comprises a polydiorganosiloxane as the component (1), a silica as the component (2) and a specific modified silicone oil as the component (3).

In the present invention, the polydiorganosiloxane and silica to be used as the components (1) and (2) are those which cooperate to form a composition substantially having an antifoaming function.

At present, compositions comprising a polydiorganosiloxane and a silica and substantially having an antifoaming function are generally known as the antifoaming agent and are called "silicone antifoaming agent", "silicone foam breaker", "silicone defoaming agent", "silicone foam controlling agent" or the like.

Accordingly, the polydiorganosiloxane to be used in the present invention as the component (1) may be any one selected from among those used in the above antifoaming agents, while the silica to be used therein as the component (2) may also be any one selected from among those used in the above antifoaming agents.

Alternatively, the above antifoaming agent comprising a polydiorganosiloxane and a silica can be preferably and advantageously used as a combination of the components (1) and (2) in the present invention. In this case, the antifoaming agent may further contain component(s) other than the polydiorganosiloxane and silica.

Particular examples of the antifoaming agent which can be used as the components (1) and (2) in the present invention include those comprising a polydiorganosiloxane and a silica as described in U.S. Pat. No. 2,632,736; those comprising a polydiorganosiloxane, a silica and a polysiloxane resin as described in U.S. Pat. No. 3,455,839 and U.S. Pat. No. 4,639,489; and those comprising a polydiorganosiloxane, a silica, a polysiloxane resin and a polyoxyalkylene-polysiloxane copolymer as described in U.S. Pat. No. 3,984,200 and U.S. application Ser. No. 310,158, filed on Feb. 10, 1989, each incorporated herein by reference to teach polydiorganosiloxanes, silicas and foam control compositions that are useful in the compositions of this invention.

Of course, the polydiorganosiloxane and silica to be used in the present invention as the components (1) and (2) are not each limited to those which have already been known as the constituents of the antifoaming agents. Even when the polydiorganosiloxane and silica which have already been known as the constitutes of the antifoaming agent are used, the kinds, combination and proportions of both components may be selected quite freely so as to attain a substantially desirable antifoaming function.

Accordingly, a composition prepared by blending a polydiorganosiloxane/silica composition, which has already been known as the antifoaming agent, with a polydiorganosiloxane or silica which is either the same as that contained in the polydiorganosiloxane/silica composition or different therefrom can be also used as a combination prepared by further adding silica to such a polydiorganosiloxane/silica composition is preferably used in the present invention to give a silicone antifoaming composition more excellent in the persistence of the foam controlling effect.

The specific modified silicone oil to be combined with the above components (1) and (2) in the present invention is one having, it its molecule, at least one functional organic group bonded to the silicon atom and having at least one functional group selected from epoxy, amino, amide, carboxyl, alkoxyl and hydroxyl groups, and at least one substituted or unsubstituted polyoxyalkylene group bonded to the silicone atom.

More particularly, the modified silicone oil is preferably a compound represented by the following general formula (I):

$$R^1_a G_b R^0_{3-a-b} SiOX_k Y_m Z_n SiG_b R^1_a R^0_{3-a-b} \qquad (I)$$

wherein X is $R^0_2SiO_{2/2}$, Y is $R^0R^1SiO_{2/2}$ and Z is $R^0GSiO_{2/2}$ with the proviso that the order of bonding among the X, Y and Z units is not particularly limited, $R^0$ is a saturated or unsaturated monovalent hydrocarbon group, a and b are each an integer 0, 1 or 2 with the proviso that the sum total of a and b does not exceed 2, k is a number of 1 to 300, m is a number of 1 to (100-a), n is a number of 1 to (300-b), $R^1$ is an organic group represented by the formula —$R^2A$ wherein $R^2$ is a divalent hydrocarbon group having 1 to 18 carbon atoms or a divalent organic group having 1 to 18 carbon atoms in which at least one hydrogen is replaced by a hydroxyl group, A represents a functional group selected from among epoxy, amino, amide, carboxyl, alkoxy and hydroxyl groups, and G is an organic group represented by the formula —$R^3O(R^4O)_pB$ wherein $R^3$ and $R^4$ each represent a divalent hydrocarbon group having 2 to 10 carbon atoms, p represents an integer of 1 to 100, B represents a hydrogen atom or an organic group selected from among monovalent hydrocarbon groups and acyl groups.

In the above formula representing G, the —$(R^4O)_p$— group is not limited to those comprising a single oxyalkylene unit, but includes those each comprising a plurality of polyoxyalkylene blocks different in respect of the number of carbon atoms constituting the alkylene group.

Among the compounds represented by the above formula (I), it is particularly preferable to use a compound represented by the formula (I) wherein $R^0$ is a methyl group, a is 0, b is 0, k is 50 to 200, m is 1 to 50, n is 1 to 50, with respect to $R^1$, $R^2$ is a ethylene or propylene group, p is a number of 1 to 60 and B is a methyl group.

Particular examples of the modified silicone oil to be used in the present invention as the component (3) include compounds represented by the following structural formulae, though the modified silicone oil is not limited to them: $Me_3SiO(Me_2SiO)_K(MeGSiO)_N(MeR^1SiO)_LSiMe_3$ wherein G is—$(CH_2)_3O(CH_2CH_2O)_P(CH_2CH(CH_3)O)_QCH_3$;

K is a number of 50 to 200, M is a number of 1 to 50, N is a number of 1 to 50, P is a number of 3 to 30 and Q is a number of 3 to 30, and $R^1$ is

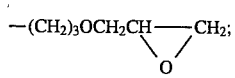

—$(CH_2)_3OCH_2CH(OH)CH_2NME_2$; or
—$(CH_2)_3OCH_2CH(OH)CH_2OC(=\!\!=\!)CH_3$.

According to the present invention, the amount of the modified silicone oil as the component (3) is 4 to 2,500 parts by weight, preferably 20 to 1,000 parts by weight, more preferably 100 parts by weight per 100 parts by weight of the sum total of the components (1) and (2). If the amount of the component (3) is too small the desired effect of the modified silicone oil will not be exhibited sufficiently, so that the persistence of the foam controlling effect will not be sufficiently improved, while if the amount is too large, the antifoaming function is too large, the antifoaming function inherent in the components (1) and (2) is in danger of lowering.

The silicone antifoaming agent composition of the present invention can be prepared by, for example, a process which comprises adding the modified silicone oil and, if necessary, a silica to a composition comprising a polydiorganosiloxane and a silica and stirring the obtained mixture in a homomixer or the like; or, a process which comprises adding the modified silicone oil in any step during the preparation of an anti foaming agent from a polydiorganosiloxane and a silica.

Of course, the silicone anti foaming composition of the present invention may, if necessary, contain other additives.

EFFECT OF THE INVENTION

Since the silicone antifoaming agent composition of the present invention contains s specific silicone oil as the component (3) in addition to a combination of a polydiorganosiloxane as the component (1) with a silica as the component (2) which substantially exhibits an antifoaming function, the persistence of the foam controlling effect is improved enough to exert a prolonged effect on the system to be treated.

The reason why such an advantageous improvement can be attained is estimated to be that the specific modified silicone oil according to the present invention has both a functional organic group containing a specific functional group and a polyoxyalkylene group in its molecule and this structural specificity may contribute to the improvement in the persistence of the antifoaming function ascribable to the components (1) and (2).

Examples of the present invention will now be given though the present invention is not limited to them. Hereinafter, all parts are by weight.

The silicone compositions, modified silicone oils and silica used in the Examples and Comparative Examples will first be given. The term "silicone composition" as used herein refers to a composition comprising a polydiorganosiloxane and a silica. The viscosity is a value determined at 25 degrees C.

Silicone Composition 1:

A silicone composition prepared according to the process described in Example 1 of Japanese Patent Laid-Open No. 251906/1985 (Example 1 of U.S. Pat. No. 4,639,489) by mixing 60 parts by weight of a trimethylsilyl-blocked polydimethylsiloxane (viscosity: 1,000 cs); 29 parts by weight of an hydroxyl-blocked polydimethylsiloxane (viscosity: 12,500 cs); and 2.9 parts by weight of ethyl polysilicate; and the mixture was heated to 130 to 140 degrees C, after which there was added 0.48 parts by weight of a catalyst prepared by heating a mixture of a trimethylsilyl-blocked polydimethylsiloxane having a viscosity of 1,000 cs with potassium hydroxide at a weight ratio of 9:1 at 120 degrees C for 15 minutes; 2.9 parts by weight of silica (surface area: 200 m²/g); and 4.8 parts by weight of an hydroxyl-blocked polydimethylsiloxane (viscosity: 40 cs); and heating was continued at 180 degrees C for 4 hours and then for 1 hour at 40 mm of Hg to remove volatile material.

Silicone Composition 2:

A silicone composition prepared according to the process described in Example 3 of Japanese Patent Publication No. 2263/1952 (equivalent to U.S. Pat. No. 2,632,736).

Silicone Composition 3:

A silicone composition prepared according to the process described in Example 1 of Japanese Patent Publication No. 23613/1970 (equivalent to U.S. Pat. No. 3,455,839).

Silicone Composition 4:

A silicone composition prepared by mixing 90 parts of polydimethylsiloxane having a viscosity of 10,000 cs, 2 parts of hexamethyldisilazane and 8 parts of silica "Aerosil #200" (a product of Nippon Aerosil) together by stirring at a room temperature for about 2 hours and homogenizing the obtained mixture with a homomixer at 160 degrees C for 5 hours.

Modified Oil 1:

An epoxidized glycol-modified silicone oil represented by the following formula:

$Me_3SiO(Me_2SiO)_{130}(MeGSiO)_{6.5}(MeR^1SiO)_{3.5}SiMe_3$ wherein G is

—$(CH_2)_3O(CH_2CH_2O)_{24}(CH_2CH(CH_3)O)_{24}CH_3$ and $R^1$ is

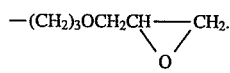

Modified Oil 2:

An epoxidized glycol-modified silicone oil represented by the following formula:

$Me_3SiO(Me_2SiO)_{130}(MeGSiO)_{6.6}(MeR^1SiO)_{3.5}SiMe_3$
wherein G is $-(CH_2)_3O(CH_2CH_2O)_{12}(CH_2CH(CH_3)O)_{12}CH_3$ and $R^1$ is

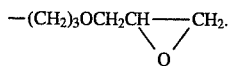

Modified Oil 3:

An epoxidized glycol-modified silicone oil represented by the following formula:

$Me_3SiO(Me_2SiO)_{247}(MeGSiO)_{16}(MeR^1SiO)_{11}SiMe_3$
wherein G is $-(CH_2)_3O(CH_2CH_2O)_{24}(CH_2CH(CH_3)O)_{24}CH_3$ and $R^1$ is

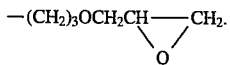

Modified Oil 4:

An epoxidized glycol-modified silicone oil represented by the following formula:

$Me_3SiO(Me_2SiO)_{130}(MeGSiO)_{6.5}(MeR^1SiO)_{3.5}SiMe_3$
wherein G is $-(CH_2)_3O(CH_2CH_2O)_{12}(CH_2CH(CH_3)O)_{12}CH_3$ and $R^1$ is

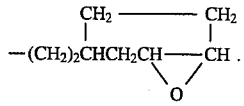

Modified Oil 5 (for comparison):

A glycol-modified silicone oil represented by the following formula:

$Me_3SiO(Me_2SiO)_{333}(MeGSiO)_8SiMe_3$ wherein G is $-(CH_2)_3O(CH_2CH_2O)_{16}(CH_2CH(CH_3)O)_{22}CH_3$.

Silica:

"QUSO WR-55 (a product of DEGUSSA Corporation).

EXAMPLES 1 to 13

One of the Si compositions 1 to 4 described above, one of the modified oils 1 to 4 described above and silica were combined according to the formulations specified in the Table and mixed together and the obtained mixture was stirred in a homomixer. Thus, thirteen antifoaming agent compositions S-1 to S-13 according to the present invention were obtained.

COMPARATIVE EXAMPLES 1 to 4

According to the formulations specified in the Table, one of the Si compositions 1 to 4 and silica were combined without adding any modified oils and mixed together and the obtained mixture was stirred in a homomixer. Thus four comparative antifoaming agent compositions C-1 to C-4 were obtained.

COMPARATIVE EXAMPLE 5

A comparative antifoaming agent composition C-5 was prepared in a similar manner to that of the anti-foaming agent composition S-2 except that a functional organic group-free modified oil 5 was used instead of the modified oil 1.

COMPARATIVE EXAMPLE 6

A comparative antifoaming agent composition C-6 was prepared from modified oil 1 and silica without using any polydiorganosiloxane.

EXAMPLE 14

An antifoaming agent composition S-14 according to the present invention was prepared in the same manner as that of the preparation of Si composition 1 except that the modified oil 1 was added after the addition of the catalyst A in such an amount as to give a content of the oil in the final antifoaming composition of 20% by weight.

Test on Antifoaming Characteristics

The antifoaming agent compositions S-1 to S-14 and C-1 to C-6 prepared above were each examined for antifoaming characteristics according to the following procedure:

1. 0.4% by weight of each of the antifoaming agent compositions was added to a mixture comprising 90 parts by weight of a blue water-base ink and 10 parts of water to give a test liquid;
2. 250 ml of this test liquid was fed into a graduated glass cylinder 10 having an inner diameter of 50 mm set in a thermostatic chamber 20 and kept at 30±1 degree C.;
3. Under this condition, the test liquid was transferred through a route shown by arrows via a circulation pipe 30 with a magnet pump of nonconnective type 40 at a flow rate of 7.5 l/min to thereby keep a state wherein the test liquid falls at all times onto the surface of the liquid phase L in the glass cylinder 10 from the outlet 35 of the pipe 30;
4. After the lapse of a predetermined time from the initiation of the circulation of the test liquid, the amount of the stably remaining foam layer B (the upper surface is shown by a chain line) formed on the liquid phase L in the glass cylinder 10 was determined by reading the graduation line of the cylinder 10.

The results are given in the Table. It is apparent from the results in the Table that the amount of the stably remaining foam layer can be reduced by using any of the antifoaming agent compositions (S-1 to S-14) according to the present invention, whereby it has been ascertained that the antifoaming agent composition of the present invention can exhibit a prolonged foam controlling effect, i.e., the persistence of the foam controlling effect of the composition according to the present invention is high.

On the other hand, it is also apparent that the antifoaming agent compositions (C-1 to C-4) of Comparative Examples 1 to 4 and the one (C-5) of Comparative Example 5 each give a large amount of a stably remaining foam layer, because the compositions are poor in the persistence of the foam controlling effect, since the compositions of Comparative Examples 1 to 4 do not contain the specified silicone oil and the one of Comparative Example 5 contains a modified silicone oil having no functional organic group.

Further, it has been ascertained that the composition of Comparative Example 6 is essentially poor in antifoaming effect, since it comprises only a specific modified silicone oil and a silica and does not contain any polydiorganosiloxane.

Figure 1:
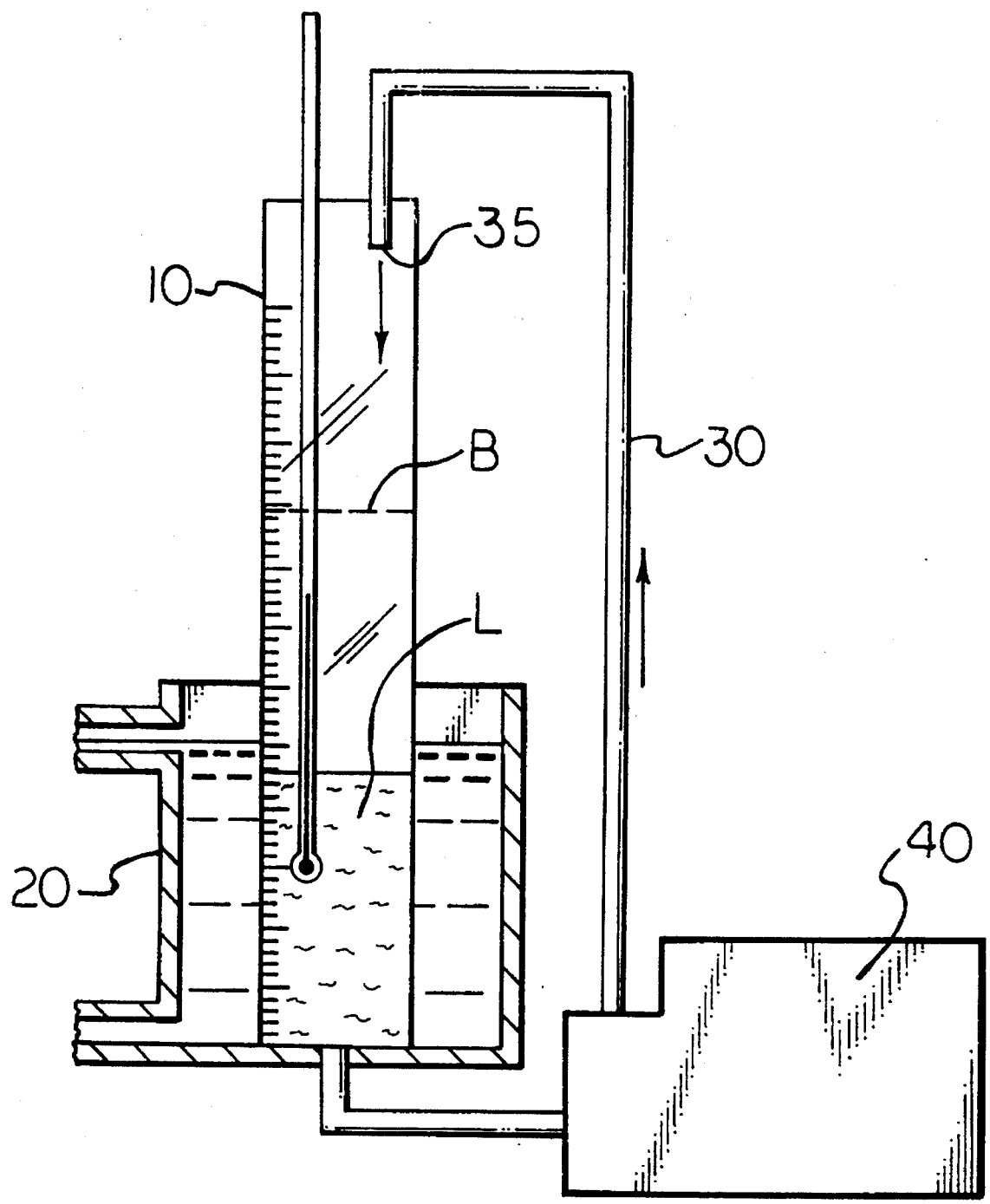
FIG. 1 is a schematic view of the test equipment used in the examination of the silicone antifoaming agent compositions for antifoaming characteristics.

| | |
|---|---|
| 10 | graduated glass cylinder |
| 20 | thermostatic chamber |
| 30 | circulation pipe |
| 35 | outlet |
| 40 | magnet pump of nonconnective type |
| L | liquid phase |
| B | stably remaining foam layer |

TABLE

| | Antifoaming composition | Silicone composition | | Silica (parts) | Modified silicone oil | | Amount of stably remaining foam layer (ml) after | | | |
|---|---|---|---|---|---|---|---|---|---|---|
| | | kind | amount (parts) | | kind | amount (parts) | 10 min | 30 min | 60 min | 90 min |
| Ex. 1 | S-1 | Si composn. 1 | 160 | — | modified oil 1 | 40 | 90 | 95 | 95 | 90 |
| Ex. 2 | S-2 | Si composn. 1 | 100 | — | modified oil 1 | 100 | 70 | 80 | 75 | 65 |
| Ex. 3 | S-3 | Si composn. 1 | 40 | — | modified oil 1 | 160 | 65 | 70 | 70 | 75 |
| Ex. 4 | S-4 | Si composn. 1 | 20 | — | modified oil 1 | 180 | 60 | 65 | 75 | 90 |
| Ex. 5 | S-5 | Si composn. 1 | 90 | 10 | modified oil 1 | 100 | 55 | 50 | 33 | 20 |
| Ex. 6 | S-6 | Si composn. 1 | 95 | 5 | modified oil 1 | 100 | 52 | 50 | 38 | 30 |
| Ex. 7 | S-7 | Si composn. 1 | 85 | 15 | modified oil 1 | 100 | 60 | 59 | 43 | 30 |
| Ex. 8 | S-8 | Si composn. 1 | 100 | — | modified oil 2 | 100 | 55 | 65 | 50 | 40 |
| Ex. 9 | S-9 | Si composn. 1 | 100 | — | modified oil 3 | 100 | 70 | 65 | 68 | 53 |
| Ex. 10 | S-10 | Si composn. 1 | 100 | — | modified oil 4 | 100 | 73 | 78 | 60 | 45 |
| Ex. 11 | S-11 | Si composn. 2 | 100 | — | modified oil 1 | 100 | 70 | 76 | 80 | 88 |
| Ex. 12 | S-12 | Si composn. 3 | 100 | — | modified oil 1 | 100 | 68 | 93 | 90 | 80 |
| Ex. 13 | S-13 | Si composn. 4 | 100 | — | modified oil 1 | 100 | 75 | 85 | 95 | 98 |
| Comp. Ex. 1 | C-1 | Si composn. 1 | 200 | — | — | — | 105 | 115 | 115 | 120 |
| Comp. Ex. 2 | C-2 | Si composn. 2 | 200 | — | — | — | 100 | 145 | 155 | 160 |
| Comp. Ex. 3 | C-3 | Si composn. 3 | 200 | — | — | — | 105 | 125 | 138 | 145 |
| Comp. Ex. 4 | C-4 | Si composn. 4 | 200 | — | — | — | 105 | 125 | 138 | 145 |
| Comp. Ex. 5 | C-5 | Si composn. 5 | 100 | — | modified oil 5 | 100 | 100 | 145 | 155 | 155 |
| Comp. Ex. 6 | C-6 | — | — | 10 | modified oil 1 | 190 | 310 | — | — | — |
| Ex. 14 | S-14 | a product prepared by the addition of 40 parts of modified oil 1 during the preparation of Si composition 1 | | | | | 85 | 95 | 90 | 85 |

That which is claimed is:

1. A silicone antifoaming agent composition comprising (1) a polydiorganosiloxane, (2) silica and (3) 4 to 2,500 parts by weight per 100 parts by weight of the sum total of the components (1) and (2) of a modified silicone oil having the formula $R^1{}_aG_bR^0{}_{3-a-b}SiOX_kY_mZ_nSiG_bR^1{}_aR^0{}_{3-a-b}$ wherein X is $R^0{}_2SiO_{2/2}$, Y is $R^0R^1SiO_{2/2}$ and Z is $R^0GSiO_{2/2}$ with the proviso that the order of bonding among the X, Y and Z units is not particularly limited, $R^0$ is a saturated or unsaturated monovalent hydrocarbon group, a and b are each an integer 0, 1 or 2 with the proviso that the sum total of a and b does not exceed 2, k is a number of 1 to 300, m is a number of 1 to (100-a) and n is a number of 1 to (300-b), $R^1$ is an organic group represented by the formula —$R^2A$ wherein $R^2$ is a divalent hydrocarbon group having 1 to 18 carbon atoms or a divalent organic group having 1 to 18 carbon atoms in which at least one hydrogen is replaced by a hydroxyl group and A represents a functional group selected from among epoxy, amino, amide, carboxyl, alkoxy and hydroxyl groups, and G is an organic group represented by the formula —$R^3O(R^4O)_pB$ wherein $R^3$ and $R^4$ each represent a divalent hydrocarbon group having 2 to 10 carbon atoms, p represents an integer of 1 to 100, and B represents a hydrogen atom or an organic group selected from among monovalent hydrocarbon groups and acyl groups.

2. A silicone antifoaming agent composition as set forth in claim 1, wherein said modified silicone oil is present in an amount of from 20 to 1000 parts by weight per 100 parts by weight of the sum total of the components (1) and (2).

3. A silicone antifoaming agent composition as set forth in claim 2, wherein said modified silicone oil is $Me_3SiO(Me_2SiO)_K(MeGSiO)_N(MeR^1SiO)_MSiMe_3$ wherein Me is methyl G is —$(CH_2)_3O(CH_2CH_2O)_E(CH_2CH(CH_3)O)_QCH_3$ K is a number of 50 to 200, M is a number of 1 to 50, N is a number of 1 to 50, P is a number of 3 to 30 and Q is a number of 3 to 30, and $R^1$ is

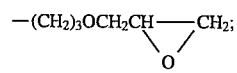

—$(CH_2)_3OCH_2CH(OH)CH_2NMe_2$:

or —$(CH_2)_3OCH_2CH(OH)CH_2OC(\!\!=\!\!O)CH_3$.

4. A silicone antifoaming agent composition as set forth in claim 3, wherein the total of components (1) and (2) consists essentially of a mixture of 60 parts by weight of a trimethylsilyl-blocked polydimethylsiloxane (viscosity: 1,000 cs);

29 parts by weight of an hydroxyl-blocked polydimethylsiloxane (viscosity: 12,500 cs);

2.9 parts by weight of ethyl polysilicate; and the mixture is heated to 130 to 140 degrees C., after which there is added 0.48 parts by weight of a catalyst prepared by heating a mixture of a trimethylsilyl-blocked polydimethylsiloxane having a viscosity of 1,000 cs with potassium hydroxide at a weight ratio of 9:1 at 120 degrees C. for 15 minutes;

2.9 parts by weight of silica (surface area: 200 m$^2$/g); and 4.8 parts by weight of an hydroxyl-blocked polydimethylsiloxane (viscosity: 40 cs); and heating is continued at 180 degrees C. for 4 hours and then for 1 hour at 40 mm of Hg to remove volatile material.

5. A silicone anti foaming agent composition as set forth in claim 4 wherein an additional 5 to 20 parts of the silica are added to the total of components (1) and (2).

* * * * *